US005850335A

United States Patent [19]

Otake

[11] Patent Number: 5,850,335

[45] Date of Patent: Dec. 15, 1998

[54] ISOLATION-TYPE SWITCHING POWER SUPPLY

[75] Inventor: Tetushi Otake, Tokyo, Japan

[73] Assignee: Toko, Inc., Tokyo, Japan

[21] Appl. No.: 829,785

[22] Filed: Mar. 31, 1997

[30] Foreign Application Priority Data

Apr. 5, 1996 [JP] Japan .................................... 7-110297

[51] Int. Cl.[6] .................................................... H02M 3/335

[52] U.S. Cl. ................................................................ 363/18

[58] Field of Search ................................. 363/16, 18, 19, 363/97, 131

[56] References Cited

U.S. PATENT DOCUMENTS

| | | | |
|---|---|---|---|
| 3,581,184 | 5/1971 | Hurd | 363/18 |
| 4,471,327 | 9/1984 | Moss | 363/18 |
| 4,941,078 | 7/1990 | Leonardi | 363/97 |
| 4,984,145 | 1/1991 | Dangschat et al. | 363/18 |

FOREIGN PATENT DOCUMENTS

06086545 A 3/1994 Japan .

*Primary Examiner*—Matthew V. Nguyen

*Attorney, Agent, or Firm*—Frishauf, Holtz, Goodman, Langer & Chick, P.C.

[57] ABSTRACT

A low-cost and highly reliable flyback isolation-type switching power supply comprises a main transformer and an auxiliary transformer. A secondary winding of the main transformer is connected in parallel with an input winding of the auxiliary transformer. A series network of a diode and a capacitor is connected between the terminals of an output winding of the auxiliary transformer, and a voltage corresponding to the output voltage of the power supply is obtained across the capacitor. The main transformer and the auxiliary transformer preferably share a core having a plurality of bobbin sections, with the windings of each transformer wound around respective different bobbin sections. The equivalent degree of coupling between the secondary winding and the output winding is thus sufficiently larger than the degree of coupling between the primary winding and the output winding.

7 Claims, 2 Drawing Sheets

ISOLATION-TYPE SWITCHING POWER SUPPLY

BACKGROUND OF THE INVENTION

1. Field of the Invention

The present invention relates to a switching power supply which regulates voltage with its input and output sides isolated by a transformer, and which comprises signal feedback means that reduces the cost of the power supply and increases the reliability of the power supply.

2. Description of the Related Art

Depending on their characteristics and applications environments, electronic apparatuses have to incorporate a power supply of which input and output sides are isolated from each other. To this end, the power supply is typically constructed of a switching type with a transformer included in circuit so that a power transmission line is isolated between the primary side and the secondary side of the transformer.

A diversity of constant voltage control methods for the output voltage of the switching power supply are available. The most widely used is a pulse width modulation (hereinafter referred to as PWM) control method. In the switching power supply implementing the PWM control method, a voltage signal corresponding to the output voltage is picked up and the on period of a switching device is varied in response to the deviation of the voltage signal from a reference value. The switching device as a component to be controlled is typically arranged on the input side of the power supply.

When the switching power supply is of an isolation type, an input-output isolation is also required in the same manner as a power transmission line with regard to the feedback line for a voltage signal (or deviation signal) corresponding to an output voltage for a constant voltage control.

A photocoupler is one of the typical means for isolating the input side of the signal feedback from the output side of the signal feedback line in the prior art. The photocoupler converts an electrical signal into an optical signal, transmits the optical signal and then converts the optical signal into an electrical signal, thereby isolating electrically between the input side and the output side of the feedback line.

When a photocoupler is used to isolate the signal feedback line, it has some advantages that first, the output voltage can be directly monitored thereby permitting a highly reliable control, and secondly, isolation can be easily done between the input side and the output side of the line. However, the photocoupler needs a driving circuit for it, increasing the component number of the power supply. The photocoupler itself is costly, and along with more components associated, the cost of the power supply is pushed up.

There exists an isolation-type switching power supply without photocoupler as a cost-conscious switching power supply as shown in FIG. 1.

As shown in FIG. 1, a flyback isolation-type switching power supply comprises a series network of a primary winding n8 of a transformer T3 and a switching transistor Q1 connected between input terminals 1*a* and 1*b*, a series network of a rectifying diode D1 and a secondary winding n9 of the transformer T3 connected between output terminals 2*a* and 2*b*, and a smoothing capacitor C2. The transformer T3 is provided with a tertiary winding n10 (working as both a feedback winding and a pickup winding at the same time), and one end of the tertiary winding n10 is connected to the base of the switching transistor Q1 through a series network of a resistor R2 and a capacitor C3, while the other end of the winding n10 is connected to the input terminal 1*b*. A series network of a diode D2 and a capacitor C4 is connected in parallel with the tertiary winding n10, and the node of the diode D2 and the capacitor C4 is connected to the base of the switching transistor Q1 through a constant-voltage diode DZ.

R1 is a starting resistor and C1 is an input capacitor.

The circuit shown in FIG. 1 is a self-oscillating switching power supply in which a self-oscillation is sustained by feeding a voltage generated in the tertiary winding n10 between the base and the emitter of the switching transistor Q1, through the resistor R2 and the capacitor C3.

Since the secondary winding n9 and tertiary winding n10 of the transformer T3 are magnetically coupled, there is a theoretical (proportional) correlation between voltages appearing in the secondary winding n9 and tertiary winding n10. The voltage appearing in the tertiary winding n10 is rectified and smoothed by the diode D2 and the capacitor C4, respectively, and a voltage signal equivalent to the output voltage of the power supply is obtained across the capacitor C4. Since the tertiary winding n10 and secondary winding n9 are isolated, the signal feedback line for the voltage signal equivalent to the output voltage is considered to be isolated between its input side and output side. The voltage equivalent to the output voltage is fed to the base of the switching transistor Q1 via the constant-voltage diode DZ, and thus the switching transistor Q1 is controlled for operation.

In the circuit shown in FIG. 1, the tertiary winding n10 serves two purposes, functioning as a feedback winding for self-oscillation and a pickup winding for constant-voltage control. In addition, a circuit for feeding back a signal for constant-voltage control is constituted by the diode D2, capacitor C4, and constant-voltage diode DZ. All of them are low-cost components, and the component number is small.

The circuit shown in FIG. 1 results in an isolation-type switching power supply far less costly than the one employing photocouplers.

Theoretically, the voltage appearing in each winding of the transformer is proportional to its turn ratio. In practice, however, the actual voltage appearing in each winding connected to its respective load fails to agree with the voltage that is calculated simply according to its turn ratio. For example, when the voltage in the primary winding is used as a reference, the actual voltage appearing in a secondary winding is typically lower than the calculated voltage, and the difference (hereinafter referred to as voltage drop component) between the actual voltage and the calculated result varies depending on the conditions of loads.

The phenomenon that the actual voltage differs from the calculated value may be caused by a diversity of factors, for example, the degree of coupling between windings in an actual transformer other than 1.0, and a voltage drop across an electric resistance existing in each winding.

When a power supply incorporating the circuit shown in FIG. 1 is produced, the voltages appearing in the secondary winding n9 and tertiary winding n10 are not the ones calculated, and errors (voltage drop component) take place between the actual voltages and calculated voltages. There is no correlation between voltage drop components for the secondary winding n9 and tertiary winding n10, and the voltage drop varies for each transformer.

In the circuit shown in FIG. 1, the on-duty of the switching transistor Q1 is varied depending on the result that is obtained by comparing the voltage across the capacitor C4 and the Zener voltage of the constant-voltage diode DZ. Specifically, the output voltage of the circuit shown in FIG. 1 is controlled based on the assumption that the output voltage is correlated with the voltage across the capacitor C4.

The voltages appearing in the secondary winding n9 and tertiary winding n10 contain errors due to voltage drop components, and because of these voltage drop components, the output voltage and the voltage across the capacitor C4 do not agree with their respective theoretically calculated values. In this condition, if the constant-voltage control of the output voltage is performed assuming that the voltage across the capacitor C4 is equivalent to the output voltage, the actual output voltage will fail to reach the design voltage determined at the design stage of the power supply. The voltages appearing in the secondary winding n9 and tertiary winding n10 are subject to errors due to the voltage drop components. As already described, since the voltage drop components appearing in the windings are different from transformer to transformer and from winding to winding, the magnitude of the errors in the output voltage of the power supply is also different from unit to unit.

When the power supply organized as shown in FIG. 1 is manufactured, the selection step of the constant-voltage diode DZ is conventionally needed. The constant-voltage diode DZ having a Zener voltage matching the voltages appearing in the secondary winding n9 and tertiary winding n10 of the transformer 3 is selected on a unit by unit basis to make the output voltage agree with its design voltage.

For this reason, the arrangement of the mass production system of the power supply having the circuit constitution shown in FIG. 1 is difficult, and the introduction of the extra manufacturing step pushes up the manufacturing cost of the power supply.

Since the voltage drop in the secondary winding n9 varies slightly depending on load condition, the stability of the output voltage in the circuit in FIG. 1 is affected by the variations in the load of the circuit, and thus the reliability of the power supply is lowered.

SUMMARY OF THE INVENTION

Accordingly, it is an object of the present invention to provide an isolation-type switching power supply that is low-cost with no expensive components, such as photocouplers, employed and with no extra manufacturing steps introduced.

It is another object of the present invention to provide an isolation-type switching power supply that is reliable presenting a highly stable output voltage.

Let $k_{12}$ represent the degree of coupling between a primary winding and a secondary winding of a transformer, $k_{13}$ represent the degree of coupling between the primary winding and a tertiary winding (pickup winding), and $k_{23}$ represent the degree of coupling between the secondary winding and the tertiary winding. Through the study of experiment results, we the inventors came to the conclusion that the voltage appearing in the tertiary winding nears the value that is calculated based on both the voltage actually appearing in the secondary winding and the turn ratio therebetween, regardless of the magnitude of a voltage drop component in the secondary winding, as the difference between $k_{23}$ and $k_{13}$ increases if the structure of the windings makes the degree of coupling $k_{23}$ larger than the degree of coupling $k_{13}$.

The isolation-type switching power supply of the present invention comprises a main transformer having a primary winding and a secondary winding, a switching element connected in series with the primary winding and turned on and off to induce a voltage in the secondary winding so that a dc voltage is obtained by rectifying the voltage appearing in the secondary winding, and a winding which is magnetically coupled to the secondary winding and which is used as a pickup winding of feedback means for constant-voltage control, wherein the degree of coupling $k_{23}$ between the secondary winding and the pickup winding is sufficiently larger than the degree of coupling $k_{13}$ between the primary winding and the pickup winding.

The present invention in one aspect comprises an auxiliary transformer besides the main transformer that constitutes the flyback isolation-type switching power supply, wherein an input winding of the auxiliary transformer is connected in parallel with the secondary winding of the main transformer.

A series network of a diode and a first capacitor is connected between the terminals of the output winding of the auxiliary transformer with the first capacitor connected to one input terminal (low voltage side). The forward direction of the diode is set such that the first capacitor is charged by the voltage appearing in the output winding of the auxiliary transformer with the switching element off.

A first resistor is connected in parallel with the first capacitor, and the node of the diode and the first capacitor is connected to the control terminal of the switching element through a constant-voltage diode.

The main transformer and the auxiliary transformer share a common core having a plural-section bobbin, the main transformer is constructed by winding the primary and secondary windings around one bobbin section, and the auxiliary transformer is constructed by winding the input winding and output winding around another bobbin section.

The present invention in another aspect comprises a core of a high-permeability magnetic material having a two-section bobbin defined by three flanges, wherein part of the primary winding, the secondary winding and the tertiary winding are wound around a second bobbin section and the remainder of the primary winding is wound around a first bobbin section.

A series network of a diode and a second capacitor is connected between the terminals of the tertiary winding with the second capacitor connected to one input terminal (low voltage side). The forward direction of the diode is set such that the second capacitor is charged by the voltage appearing in the tertiary winding with the switching element off.

A first resistor is connected in parallel with the second capacitor, and the node of the diode and the second capacitor is connected to the control terminal of the switching element through a constant-voltage diode.

DESCRIPTION OF THE PREFERRED EMBODIMENTS

Figure 1:
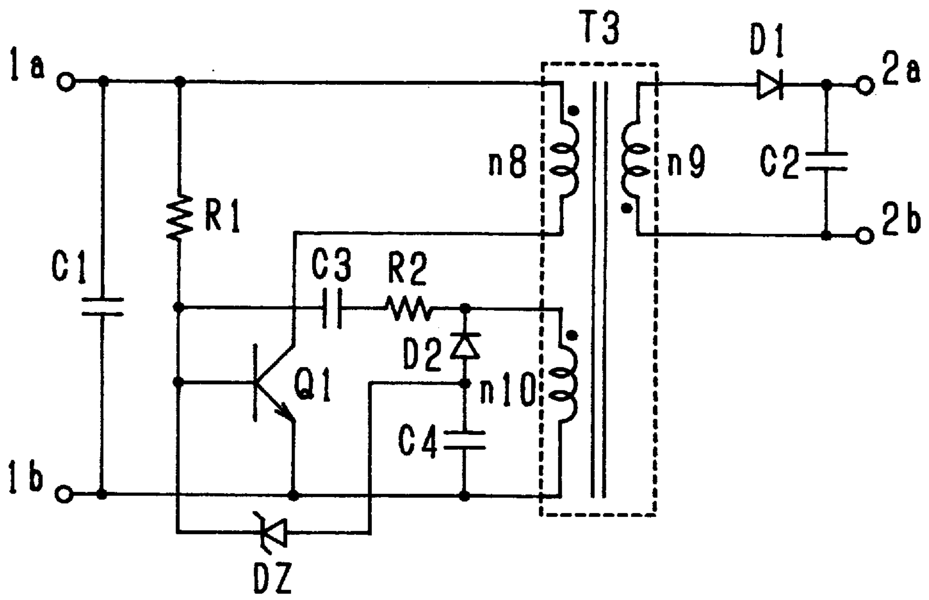
Fig. 1 (PRIOR ART)
FIG. 1 is a schematic diagram showing an isolation-type switching power supply that eliminates the need for conventional photocouplers.
Figure 2:
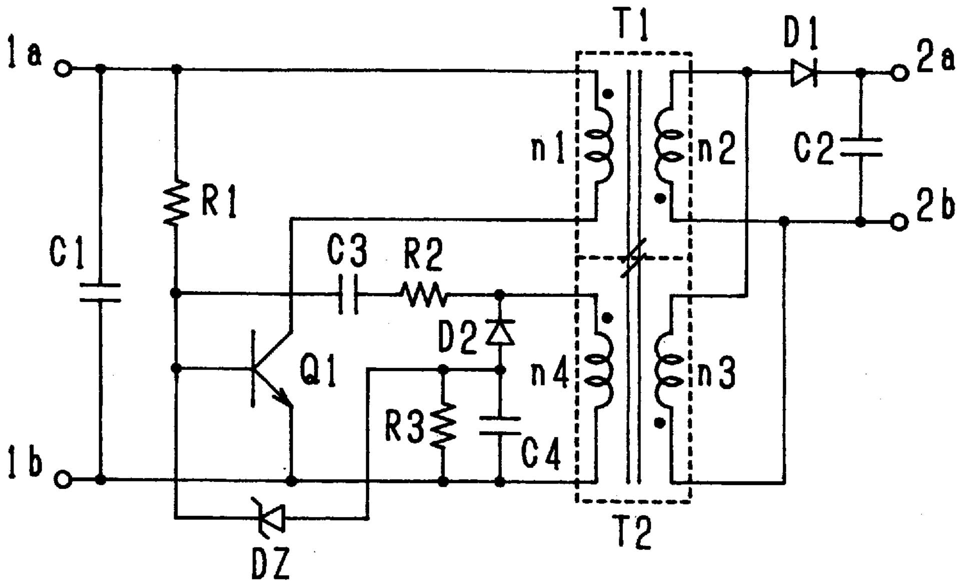
FIG. 2 is a schematic diagram showing one embodiment of the isolation-type switching power supply of the present invention.

FIG. 2 shows one embodiment of the isolation-type switching power supply of the present invention, which is low-cost and highly reliable. In FIG. 2, components equivalent to those described with reference to FIG. 1 are designated with the same reference numerals.

As shown, a flyback isolation-type switching power supply comprises a series network of a primary winding n1 of a main transformer T1 and a switching transistor Q1 connected between input terminals 1*a* and 1*b*, a series network of a rectifying diode D1 and a secondary winding n2 of the transformer T1 connected between output terminals 2*a* and 2*b*, and a smoothing capacitor C2.

An auxiliary transformer T2 is added to this isolation-type switching power supply. An input winding n3 of the auxiliary transformer T2 is connected in parallel with the secondary winding n2 of the main transformer T1. One end of an output winding n4 of the auxiliary transformer T2 is connected to the node of the emitter of the switching transistor Q1 and the input terminal 1*b*, and the other end of the output winding n4 of the auxiliary transformer T2 is connected to the base of the switching transistor Q1 via a series network of a resistor R2 and a capacitor C3. A series network of a diode D2 and a capacitor C4 is connected between the terminals of the output winding n4 of the auxiliary transformer T2, the cathode of the diode D2 being connected to one terminal of the output winding n4 connected to the resistor R2. A resistor R3 is connected in parallel with the capacitor C4. The node of the diode D2 and the capacitor C4 is connected to the anode of a constant-voltage diode DZ, the cathode of which is connected to the base of the switching transistor Q1.

The base of the switching transistor Q1 is connected to the input terminal 1*a* (high voltage side) via a starting resistor R1.

The polarity of the output winding n4 of the auxiliary transformer T2 is set such that the switching transistor Q1 is forward biased through the resistor R2 and the capacitor C3 by the voltage that appears in the output winding n4 through the secondary winding n2 and input winding n3 with a current flowing through the primary winding n1 of the main transformer T1.

In this arrangement, the auxiliary transformer T2 induces in its output winding n4 a voltage that is correlated with the voltage appearing in the secondary winding n2 of the main transformer. The switching transistor Q1 self-oscillates from the voltage appearing in the output winding n4, and the output winding n4 works in the same way as a tertiary winding n10 in the circuit shown in FIG. 1.

The voltage appearing in the output winding n4 is rectified and smoothed by the diode D2 and the capacitor C4, respectively, and a voltage signal equivalent to the output voltage is obtained across the capacitor C4. When the switching transistor Q1 is on, the current flowing through the constant-voltage diode DZ and the base current flowing through the switching transistor Q1 vary depending on the voltage across the capacitor C4, the Zener voltage of the constant-voltage diode DZ, and the voltage in the output winding n4. The on period of the switching transistor Q1 changes depending on the output voltage, and thus the output voltage is controlled to a constant value.

The circuit of the present invention shown in FIG. 2 is different from the prior art circuit shown in FIG. 1 in that the circuit of FIG. 2, with the tertiary winding (n10) dispensed with, employs the separately arranged auxiliary transformer T2 for picking up the voltage appearing in the secondary winding n2 for obtaining the output voltage (equivalent to n9 in FIG. 1).

In such an arrangement, the degree of coupling $k_{23}$ that apparently exists, through the input winding n3 of the auxiliary transformer T2, between the secondary winding n2 of the main transformer T1 and the output winding n4 of the auxiliary transformer T2, is considered to be approximately equal to the degree of coupling between the input winding n3 and the output winding n4 of the auxiliary transformer. On the other hand, the degree of coupling $k_{13}$ between the primary winding n1 of the main transformer T1 and the output winding n4 of the auxiliary transformer T2 is zero if the main transformer T1 and the auxiliary transformer T2 are completely isolated in their magnetic paths. Thus, the degree of coupling $k_{23}$ is sufficiently larger than the degree of coupling $k_{13}$.

The voltage appearing in the output winding n4 of the auxiliary transformer T2 is approximately equal to the value that is calculated from the voltage appearing in the secondary winding n2 and the turn ratio of the auxiliary transformer T2. Therefore, the step for selecting the constant-voltage diode showing the Zener voltage appropriate for each transformer is eliminated, and thus the cost involved is also eliminated.

Since a voltage corresponding to the voltage actually appearing in the secondary winding n2 appears in the output winding n4 of the auxiliary transformer T2 regardless of the magnitude of the voltage drop component appearing in the secondary winding n2 of the main transformer T1, the stability of the output voltage is prevented from falling under the variations in the load of the power supply. The above-described simple construction results in a high output stability, and thus a highly reliable power supply is provided.

The main transformer T1 and the auxiliary transformer T2 may be separate ones. With a view to reducing the cost of the power supply, however, the main transformer T1 and the auxiliary transformer T2 are preferably arranged as follows.

Figure 3:
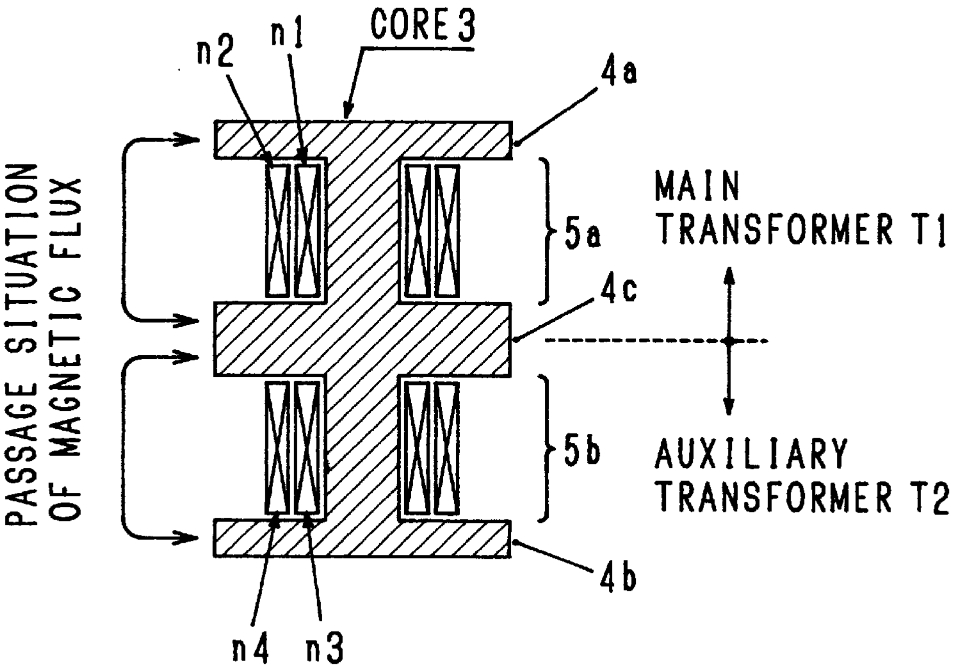
FIG. 3 shows one embodiment of transformers (a main transformer and an auxiliary transformer) of the isolation-type switching power supply of the present invention.

As shown in FIG. 3, prepared is a core 3 of a high permeability magnetic material having two bobbin sections 5*a*, 5*b* which are partitioned by a central flange portion 4*c* and two end flange portions 4*a*, 4*b* at both ends. Windings n1 and n2 of the main transformer T1 are wound around the bobbin section 5*a* of the core 3, windings n3 and n4 of the auxiliary transformer T2 are wound around the bobbin section 5*b*, and thus a single core is shared by two transformers.

By arranging the main transformer T1 and the auxiliary transformer T2 in this way, the component cost is substantially reduced in comparison with the case of two separate transformers used.

A slight degree of magnetic coupling still exists between the main transformer T1 and the auxiliary transformer T2 arranged as shown in FIG. 3. In the transformer shown in FIG. 3, when flange portions 4*a*, 4*b* and 4*c* are of almost the same shape and size, the degree of coupling between the primary winding n1 and the secondary winding n2 and the degree of coupling between the input winding n3 and the output winding n4 are respectively approximately 0.96, while the degree of coupling between the primary winding n1 and the output winding n4 with no input winding n3 interposed therebetween is nearly 0.50, though these figures also depend on the shape of the core and state of the windings. As understood from the operation of the circuit shown in FIG. 2, there is practically no adverse effect arising from magnetic coupling between the main transformer T1 and the auxiliary transformer T2, because the operation of the auxiliary transformer T2 is subordinate to the main transformer T1. As long as the equivalent degree of coupling $k_{23}$ between the secondary winding n2 and the output winding n4 is sufficiently larger than the degree of coupling $k_{13}$ between the primary winding n1 and the output winding n4, the main transformer T1 and the auxiliary transformer T2 may be magnetically coupled, or, in other words, both may be combined and regarded as a single transformer.

Figure 4:
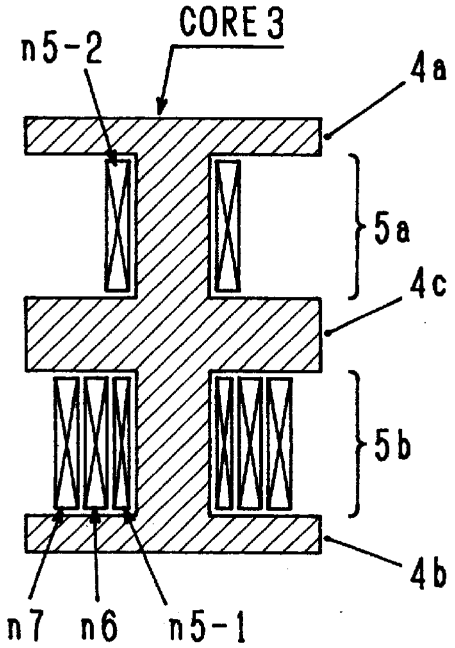
FIG. 4 shows another embodiment of transformers of the isolation-type switching power supply of the present invention.

A winding structure shown in FIG. 4 also makes the degree of coupling $k_{23}$ sufficiently larger than the degree of coupling $k_{13}$ in a single transformer.

Specifically, a high permeability core 3 has three flange portions 4*a*, 4*b* and 4*c* with two bobbin sections 5*a*, 5*b* partitioned by the central flange portion 4*c*. Part winding n5-1 of a primary winding n5, a secondary winding n6 and a tertiary winding (pickup winding) n7 are sequentially wound around the bobbin section 5*b* of the core 3, and the remainder winding n5-2 of the primary winding n5 is wound around the bobbin section 5*a*.

In this winding structure, the magnetic flux from the winding n5-2 flows out of the central flange portion 4*c*, not intersecting the secondary winding n6 and tertiary winding n7, and thus the degree of coupling $k_{13}$ between the primary winding n5, a combination of the windings n5-1 and n5-2, and the tertiary winding n7 is naturally low. Since the secondary winding n6 and the tertiary winding n7 are wound around the same bobbin section 5*b*, the degree of coupling $k_{23}$ between the secondary winding n6 and the tertiary winding n7 is high.

In the transformer of the winding structure shown in FIG. 4, when the core 3 has three generally identically shaped flange portions 4*a*, 4*b* and 4*c*, the degree of coupling between the secondary winding n6 and tertiary winding n7 is 0.96 while the degree of coupling between the entire primary winding n5 and the tertiary winding n7 is 0.50 or so with the turn ratio of part winding n5-1 of the primary winding n5 to the remainder winding n5-2 of the primary winding n5 being 1:1.

If the degree of coupling $k_{23}$ is set to be sufficiently larger than the degree of coupling $k_{13}$ in this way, the voltage appearing in the tertiary winding n7 approximately agrees with the value that is calculated based on the voltage actually appearing in the secondary winding n6 and the turn ratio of the secondary winding n6 and the tertiary winding n7.

The circuit that employs the transformer shown in FIG. 4 remains the same as that of the prior art switching power supply shown in FIG. 1. In this case, the entire primary winding n5 shown in FIG. 4 is used as the primary winding n8 in the prior art power supply shown in FIG. 1, the secondary winding n6 shown in FIG. 4 is used as the secondary winding n9 shown in FIG. 1, and the tertiary winding n7 shown in FIG. 4 is used as the tertiary winding n10 shown in FIG. 1.

The winding structure of the transformer shown in FIG. 4 has a lower degree of coupling between the entire primary winding n5 and the secondary winding n6, compared with the winding structure of the transformer shown in FIG. 3. The winding structure of the transformer shown in FIG. 3 is thus more preferable.

When a transformer is manufactured in practice, the degree of coupling of windings is approximately 0.98 at maximum even if the windings are fine-pitched. Given the same structural conditions in terms of the core, bobbin sections, the number of turns and manner of winding, a coarse-pitched winding will result in a degree of coupling of 0.90 or so. The difference in the degree of coupling between fine-pitched and coarse-pitched windings is 0.1 at most unless the structural condition is changed. In an automated manufacturing process, variations in the degree of coupling from transformer to transformer in actually manufactured products are typically 0.03 at most.

Referring to these degrees of coupling in the actual transformers, the transformers present almost the same degree of coupling in value rather than a wide range of variations. However, a slight difference in the decimal fraction value at two decimal places in combination with a voltage drop across an electrical resistance in each winding gives rise to variations in the output voltage from power supply to power supply, and lowers the stability of the output voltage.

In view of the difference in degree of coupling that is large enough to be problematic, it is considered in this technical field that the degree of coupling $k_{23}$ is sufficiently larger than the degree of coupling $k_{13}$ if $k_{23}$ is 1.2 times as large as or greater than $k_{13}$.

As shown in FIG. 2, the resistor R3 is connected in parallel with the capacitor C4 for obtaining the voltage signal corresponding to the output voltage, but the resistor R3 may be removed from the circuit depending on the specification of the power supply.

As shown in FIG. 2, the output winding n4 of the auxiliary transformer T2 serves two purposes, functioning as a feedback winding for self-oscillation and a pickup winding for controlling output voltage. The main transformer T1 may be provided with a tertiary winding, which may be used as a feedback winding for self-oscillation, and the output winding n4 may be dedicatedly used as a pickup winding only.

The above embodiments have been described in connection with the self-oscillating, flyback isolation-type switching power supply. The present invention is not limited to this type of power supply. The present invention may be implemented in a diversity of circuits including a separate-oscillation type or forward type.

What is claimed is:

1. An isolation-type switching power supply comprising:

a main transformer having a primary winding and a secondary winding, a switching element connected in series with the primary winding and turned on and off to induce a voltage in the secondary winding so that a dc output voltage is obtained by rectifying the voltage appearing in the secondary winding, an auxiliary winding electrically connected to the secondary winding, and a pickup winding magnetically coupled to the auxiliary winding, wherein where a first coupling coefficient between the primary winding and the pickup winding is $k_{13}$, and a second coupling coefficient between the secondary winding obtained equivalently through the auxiliary winding and the pickup winding is $k_{23}$, a relationship between the first coupling coefficient and the second coupling coefficient is $k_{13} << k_{23}$, thereby leading a signal corresponding to a voltage generated in the secondary winding to the pickup winding through the auxiliary winding, and using a voltage appearing in the pickup winding as a feedback signal for a constant-voltage control.

2. An isolation-type switching power supply comprising:

a main transformer having a primary winding and a secondary winding, a switching element connected in series with the primary winding and turned on and off to induce a voltage in the secondary winding so that a dc output voltage is obtained by rectifying a voltage appearing in the secondary winding, and an auxiliary transformer having an input winding and an output winding, the input winding being connected in parallel with the secondary winding of the main transformer, wherein a dc voltage signal that is obtained by rectifying a voltage appearing in the output winding of the auxiliary transformer is used as a feedback signal for on-duty control of the switching element.

3. An isolation-type switching power supply according to claim 2, wherein the voltage appearing in the output winding of the auxiliary transformer is used as an oscillation signal for self-oscillation.

4. An isolation-type switching power supply according to claim 2, wherein the main transformer and the auxiliary transformer share a single core having at least a first bobbin section and a second bobbin section, with the primary and secondary windings of the main transformer wound around the first bobbin section and the input and output windings of the auxiliary transformer wound around the second bobbin section.

5. An isolation-type switching power supply according to claim 3, wherein the main transformer and the auxiliary transformer share a single core having at least a first bobbin section and a second bobbin section, with the primary and secondary windings of the main transformer wound around the first bobbin section and the input and output windings of the auxiliary transformer wound around the second bobbin section.

6. An isolation-type switching power supply comprising a transformer having a primary winding and a secondary winding, and a switching element connected in series with the primary winding and turned on and off to induce a voltage in the secondary winding so that a dc output voltage is obtained by rectifying the voltage appearing in the secondary winding, the transformer comprising a core having a plurality of bobbin sections thereon with the magnetic path of the core decoupled at a partition between the bobbin sections, wherein part of the primary winding, the secondary winding and a tertiary winding are wound around one of the bobbin sections of the core and the remainder of the primary winding is wound around the other bobbin section, and wherein a dc voltage signal that is obtained by rectifying a voltage appearing in the tertiary winding is used as a feedback signal for on-duty control of the switching element.

7. An isolation-type switching power supply according to claim 6, wherein the degree of coupling between the secondary winding and the tertiary winding is sufficiently larger than the degree of coupling between the entire primary winding and the tertiary winding.

* * * * *

UNITED STATES PATENT AND TRADEMARK OFFICE

CERTIFICATE OF CORRECTION

PATENT NO. : 5,850,335
DATED : December 15, 1998
INVENTOR(S) : OTAKE, Tatushi

It is certified that error appears in the above-identified patent and that said Letters Patent is hereby corrected as shown below:

On the Title page:

Under Item [30], "Foreign Application Priority Data"

"7-110297" should be --8-110297--.

Signed and Sealed this

Seventeenth Day of August, 1999

Attest:

Q. TODD DICKINSON

*Attesting Officer* *Acting Commissioner of Patents and Trademarks*